UNITED STATES PATENT OFFICE.

GEORGE W. TOOKER, OF NEW YORK, N. Y.

GILDING CHINA, EARTHENWARE, OR PORCELAIN ARTICLES.

SPECIFICATION forming part of Letters Patent No. 603,296, dated May 3, 1898.

Application filed August 7, 1897. Serial No. 647,492. (Specimens.)

*To all whom it may concern:*

Be it known that I, GEORGE W. TOOKER, a citizen of the United States, and a resident of New York, in the county of New York and State of New York, have invented certain new and useful Improvements in Gilding China, Earthenware, or Porcelain Articles, of which the following is a specification.

The invention relates to the gilding of china, earthenware, and porcelain articles, such as dishes and the like; and it consists in the novel processes hereinafter described and claimed, whereby the gold applied to the plain, hard, or finished ware is rendered entirely permanent thereon.

It is well understood that the question of retaining gold or gilding on ware, so that it will be permanent thereon and not wash off or wear off, has been a subject of serious consideration, and it is believed that never before the present invention has any process been produced by which the gold decorations were successfully preserved and rendered practically as lasting as the ware to which they were applied.

In the following description I explain my invention in several preferred methods of carrying the same into practical effect, and in accordance with one of said methods I take one part of gold prepared by precipitation with mercury and one part of gold precipitated with potash carbonate and oxalic acid, and the gold having been fluxed with about one and one-half grains of oxid of bismuth to each pennyweight of the gold mix the same with oil of turpentine in suitable quantity to render the same of proper consistency for use in hand-painting. The gold thus prepared will then be applied to the plain, finished, or hard ware—that is, ware glazed and fired—by hand-painting, and thereafter the ware will be subjected to a heat or firing of about 1,500° Fahrenheit. After this firing the gold surfaces of the ware will be burnished and rendered smooth and uniform, a "glass brush" being preferably used for the purpose, and thereupon a grounding-oil will be brushed over the decorated surfaces, and upon this oil will be dusted a glaze preferably composed of a mixture of about four parts of "No. 8 flux" and one part of "special soft flux," after which the ware is again fired under a heat slightly less than that used in the previous firing, this completing the process and leaving the gold surfaces smooth, protected against abrasive action, and a permanent part of the ware.

No. 8 flux and special soft flux are articles of commerce, and No. 8 flux is formed by melting in a crucible eight parts of red lead, six parts of fused borax, and two parts of flint, the resultant composition being ground into a powder. Special soft flux is produced by melting in a crucible ten parts of red lead, six parts of fused borax, and four parts of flint-glass, then adding two parts of sal-pennel, and thereafter reducing the composition by grinding into a powder.

When the decoration is to be applied to the ware by printing or transferring, I mix the gold prepared as above described with printing-oil in lieu of oil of turpentine, and then proceed to carry out the process above described, the burnishing of the gold surfaces after the first firing being preferably performed by a bloodstone.

When it is desired to use a powdered gold in the application of the decoration and dust the same upon the outlines formed in oil upon the ware by a rubber stamp, I mix the potash-gold in a dry state with calomel (light chlorid of mercury) in the proportion of about two grains of the calomel to one pennyweight of the gold. A ground of oil is then applied to the ware by means of a rubber stamp bearing the desired ornate outlines or figures, and upon this ground is dusted the dry gold powder, after which the general process above explained is proceeded with to completion, the burnishing of the gold surfaces after the first firing being preferably performed with a bloodstone, and the final glaze being preferably applied by a brush and formed by mixing the fluxes above described with oil of turpentine in lieu of grounding-oil.

From the methods above explained it will be seen that the material steps of the present process consist, first, in applying the gold to the finished plain ware; second, firing the ware; third, burnishing the gold surfaces; fourth, applying the grounding-oil and glaze to cover the gold decorations, and, fifth, again firing the ware, but at a lower temperature than the previous firing fixing the gold.

The result of my process is that the gold is rendered lasting on the ware, substantially as lasting as the ware itself, and the decorated articles have imparted to them a highly-attractive appearance and possess the merit of being permanent in value.

The methods other than as denoted in the claims of carrying the invention into effect will vary with individual judgment, and hence in this application I do not wish to be limited to them.

The gold used in accordance with my invention is a precipitate of gold as distinguished from a bright chlorid of gold, and I am enabled thereby to attain results never before, so far as I know, accomplished, and not possible, I believe, of being secured with bright chlorid of gold.

What I claim as my invention, and desire to secure by Letters Patent, is—

1. The process hereinbefore described of gilding plain-finished china, earthenware and porcelain articles, which consists in, first, applying precipitate of gold to the article, second, firing the article, third, burnishing the gold surfaces, fourth, applying the glaze substance to cover the gold decorations, and, fifth, again firing the article but at a lower temperature than the previous firing to fuse the glaze substance; substantially as set forth.

2. The process hereinbefore described of gilding plain-finished china, earthenware and porcelain articles, which consists in, first, applying the precipitate of gold to the article, second, firing the article, third, burnishing the gold surfaces, fourth, applying the grounding-oil and glaze substance to cover the gold decorations, and, fifth, again firing the article, but at a lower temperature than the previous firing to fuse the glaze substance; substantially as set forth.

3. As a new article of manufacture, a china, earthenware or porcelain article comprising as an integral structure the main body, the glaze substance covering and integral with said body, the decoration in precipitate of gold on said glaze covering, and the thin glaze substance over said gold decoration and integral therewith and with said glaze covering, the whole being of the character and construction described.

Signed at New York, in the county of New York and State of New York, this 6th day of August, A. D. 1897.

GEORGE W. TOOKER.

Witnesses:
CHAS. C. GILL,
EDWIN T. COLLINS.